United States Patent [19]

Evans et al.

[11] Patent Number: 5,471,815
[45] Date of Patent: * Dec. 5, 1995

[54] CONTINUOUSLY ROTATING PLATFORM WITH MULTIPLE MOUNTED DOUBLE CLIPPERS FOR CONTINUOUSLY FORMING LINK PRODUCT

[75] Inventors: Alfred J. Evans, Raleigh; Grant K. Chen, Cary; Dennis J. May, Pittsboro; Edward P. Brinson, Raleigh, all of N.C.

[73] Assignee: Delaware Capital Formation, Inc., Apex, N.C.

[ * ] Notice: The portion of the term of this patent subsequent to Apr. 18, 2006, has been disclaimed.

[21] Appl. No.: 90,396

[22] Filed: Jul. 12, 1993

Related U.S. Application Data

[63] Continuation of Ser. No. 685,900, Apr. 12, 1991, Pat. No. 5,259,168, and a continuation of Ser. No. 270,222, Nov. 14, 1988, Pat. No. 5,020,298, and a continuation-in-part of Ser. No. 105,665, Oct. 7, 1987, Pat. No. 4,821,485.

[51] Int. Cl.⁶ ............................... B65B 9/15; B65B 51/05
[52] U.S. Cl. ...................... 53/138.4; 53/576; 29/243.57
[58] Field of Search ............................ 29/243.56, 243.57; 53/138.4, 550, 567, 576

[56] References Cited

U.S. PATENT DOCUMENTS

| | | | |
|---|---|---|---|
| 3,279,033 | 10/1966 | Normand et al. | 53/138.4 X |
| 3,383,746 | 5/1968 | Narduzzi et al. | 53/138.4 X |
| 3,783,583 | 1/1974 | Dobbert | 53/138.4 |
| 3,802,054 | 4/1974 | Takeda | 53/138.4 X |
| 4,100,716 | 7/1978 | Barroso | 53/138.4 |
| 4,109,363 | 8/1978 | Velarde | 53/138.4 X |
| 4,428,176 | 1/1984 | Burrell | 53/138.4 |
| 4,571,805 | 2/1986 | Niedecker | 53/138.4 X |
| 4,766,713 | 8/1988 | Evans | 53/138.4 X |
| 4,821,485 | 4/1989 | Evans et al. | 53/138.2 |
| 5,020,298 | 6/1991 | Evans et al. | 53/138.2 |

Primary Examiner—John Sipos
Assistant Examiner—Daniel Moon
Attorney, Agent, or Firm—Allegretti & Witcoff, Ltd.

[57] ABSTRACT

An improved packaging device designed for the filling of flexible, tubular casing and for the sealing of the casing in discreet lengths which may then be further processed or packaged. The device includes a mounting assembly having a floor mounted frame with a rotatable platform supported by the frame. Adjacent the frame and platform is a device for feeding product through a product horn into casing which is shirred on the horn. The platform includes a plurality of specially designed clippers arranged in a circular array. As filled casing is discharged from the feeding mechanism it is directed tangentially into the circular array of rotating clippers which are equally spaced from each other. The clippers sequentially operate to gather the casing, apply spaced, double clips to the casing, sever the connection between adjacent clips, and to then discharge the packaged link from the device.

4 Claims, 1 Drawing Sheet

CONTINUOUSLY ROTATING PLATFORM WITH MULTIPLE MOUNTED DOUBLE CLIPPERS FOR CONTINUOUSLY FORMING LINK PRODUCT

BACKGROUND OF THE INVENTION

This is a continuation of Ser. No. 07/685,900, Apr. 12, 1991, U.S. Pat. No. 5,259,168, and a continuation of Ser. No. 270,222, Nov. 14, 1988, U.S. Pat. No. 5,020,298, and a continuation-in-part of Ser. No. 105,665, Oct. 7, 1987, U.S. Pat. No. 4,821,485.

DESCRIPTION OF THE PREFERRED EMBODIMENTS

I. The Embodiment of FIG. 1

A. General Description

Figure 1:
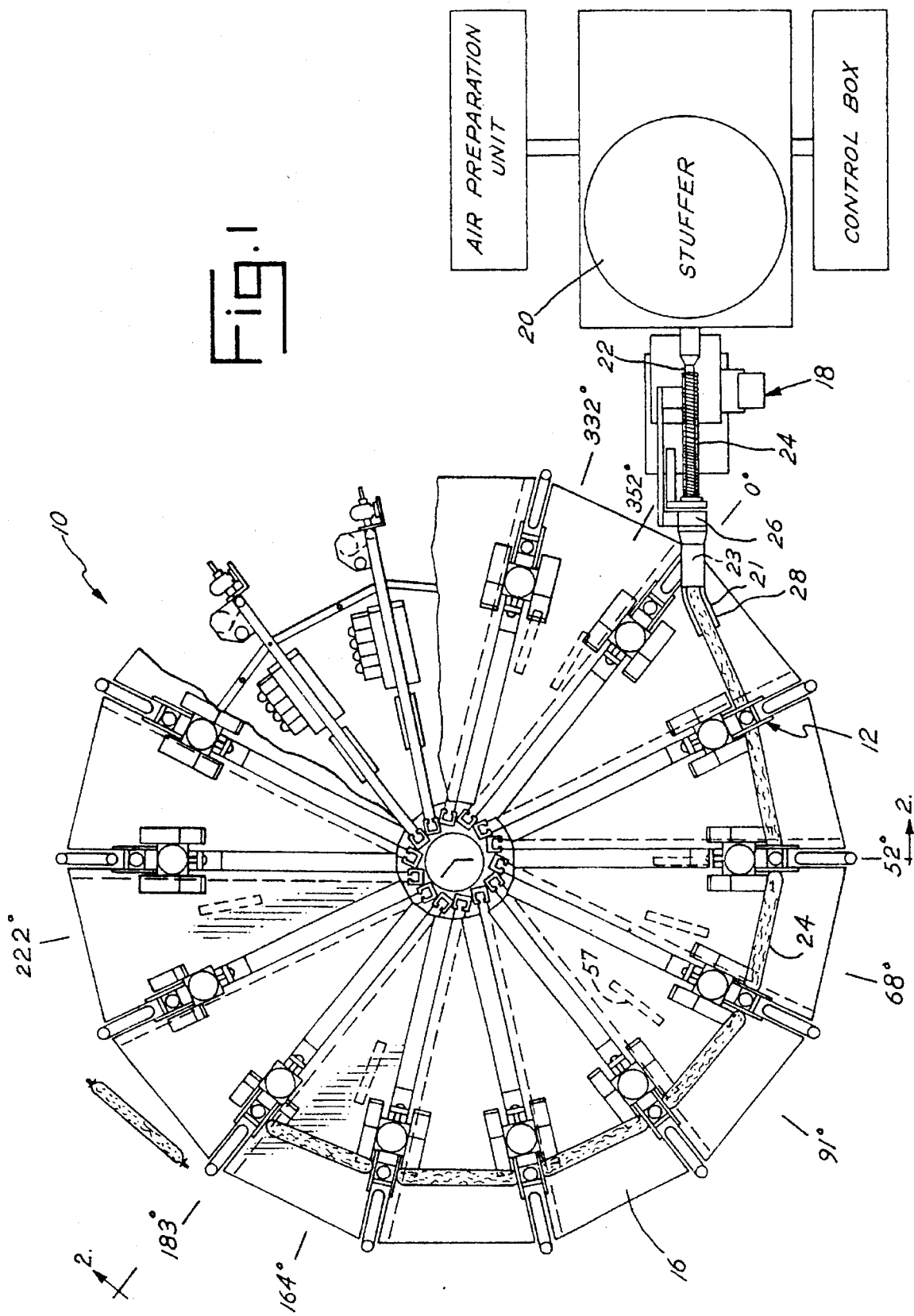

FIG. 1 is a schematic top plan view of the improved packaging device of the invention.

The device generally includes a mounting assembly 10 having supported thereon a plurality of clippers 12. As depicted, each clipper 12 is normally positioned at an equal radial distance from a vertical rotation axis associated with a platform 16 of assembly 10. The device also includes a casing feed mechanism or construction 18 which receives food product, such as sausage, from a stuffing machine 20. The product is directed through a stainless steel tube or horn 22 associated with the casing feed mechanism 18 and into casing 24 which is shirred on the horn 22. As the casing 24 is filled by discharge of product from the horn 22, the casing is restrained by a brake 26. The filled casing 24 is then directed by a chute or channel 28 in a generally tangential direction with respect to the clippers 12 and in the direction of rotation of the platform 16 as indicated by the arrow in FIG. 1.

Columns 1 through 3, column 4 lines 1 through 32 and 57 through 68, and columns 5 through 16, line 59 of U.S. Pat. No. 5,020,298 are incorporated by reference.

FIGS. 2 through 37 of U.S. Pat. No. 5,020,298 are also incorporated by reference.

What is claimed is:

1. An improved packaging device for filling flexible casing and sealing discrete lengths of filled casing comprising, in combination:

a clipper mounting assembly including a floor mounted frame and a platform supported by the frame, said platform rotatable in a horizontal plane relative to the frame;

a plurality of clippers mounted on the platform, each clipper spaced radially from a vertical axis through the platform, each clipper including pressurized-fluid-driven means for attaching a clip about filled casing by gathering said casing and subsequently forming a U-shaped clip about the gathered casing with cooperative punch and die means, each of said clippers extending radially outwardly from its axis on the platform;

means for continuously rotating the platform and clippers mounted thereon about an axis in a uniform direction;

means positioned at one side of the platform for feeding filled casing sequentially into each clipper as each one of said clippers moves, by platform rotation, past the means for feeding; and means for sequentially operating the clippers as the platform is rotated whereby as each clipper is in position to receive filled casing as it moves past the means for feeding, said clipper operates to subsequently gather the casing, to form a U-shaped metal clip about the casing, to separate separate links of casing, to release the casing link and to discharge the filled link from the platform.

2. An improved packaging device for filling flexible casing and sealing discrete lengths of filled casing comprising, in combination:

a clipper mounting assembly including a floor mounted frame and a platform supported by the frame, said platform rotatable in a generally horizontal plane relative to the frame about a vertical axis;

a plurality of clippers mounted on the platform, each clipper spaced radially from said vertical axis, each clipper including means for gathering casing and means for subsequently forming a U-shaped clip about the gathered casing comprising cooperative punch and die means;

means for continuously rotating the platform and clippers mounted thereon about said vertical axis in a uniform direction;

means positioned at one side of the platform for feeding continuously filled casing sequentially into each clipper as each one of said clippers moves, by platform rotation, past the means for feeding; and means for sequentially operating each of the clippers as the platform is rotated to receive filled casing as each clipper moves past the means for feeding, to subsequently gather the casing, to form a U-shaped clip about the casing to form separate links of filled casing, to release the casing links, to discharge each filled link from the platform, and to subsequently reposition each clipper sequentially to again receive filled casing.

3. The packaging device of claim 2 wherein each clipper includes a throat which may be opened to receive casing and closed to gather casing, said open throat of each clipper extending radially outward from the vertical axis.

4. The packaging device of claim 3 including a gate pivotally mounted on each clipper, said gate pivotal between an open and a closed position to expose or close the throat for receipt or gathering of casing respectively.

* * * * *